Sept. 5, 1967 G. CHAPLENKO 3,339,653
CONTROL CIRCUIT FOR ELECTRIC-POWERED VEHICLE
Filed Sept. 1, 1965 2 Sheets-Sheet 1

INVENTOR
GEORGE CHAPLENKO
BY Frederick W. Padden
ATTORNEY

Sept. 5, 1967    G. CHAPLENKO    3,339,653
CONTROL CIRCUIT FOR ELECTRIC-POWERED VEHICLE
Filed Sept. 1, 1965    2 Sheets-Sheet 2

INVENTOR
GEORGE CHAPLENKO
BY *Frederick W. Fadden*
ATTORNEY

United States Patent Office 3,339,653
Patented Sept. 5, 1967

3,339,653
CONTROL CIRCUIT FOR ELECTRIC-POWERED VEHICLE
George Chaplenko, Edison Township, Middlesex County, N.J. (73 Alexander St., Metuchen, N.J. 08840)
Filed Sept. 1, 1965, Ser. No. 484,217
10 Claims. (Cl. 180—2)

This invention relates to electrical circuits and particularly to circuitry for selectively controlling the operation of a plurality of electroresponsive devices over a minimal number of conductors. My invention further relates to apparatus which controls the speed and steering of electrically-powered, wheel-driven vehicles on tracks or a driving surface.

It is often desirable to control the operation of a plurality of remotely located devices, such as motors and solenoids, over a minimal number of conductors. One such situation arises, for example, in the control of electrical motors for driving wheeled vehicles. All of the known prior art arrangements used for controlling the operation and speed of such motors have proven complex and costly due to the need for a substantial amount of apparatus and many conductors between the control apparatus and the remotely located motors.

In view of the foregoing, it is an object of my invention to provide a simple and economical means for controlling the operation of a plurality of remotely located electroresponsive devices over a minimal number of conductors.

Another object is to provide improved means for selectively controlling the operation and speed of a plurality of electrical motors.

These and other objects are attained in accordance with a specific illustrative embodiment of my invention wherein control circuitry is furnished for selectively operating a pair of direct current (DC) motors at adjustable speeds over a pair of conductors. The control circuitry comprises an alternating current (AC) source which is connectable through a pair of oppositely poled diodes each of which is connected individually to one terminal of a potentiometer for supplying adjustable magnitudes of negative and positive half-cycles of the supplied current at the potentiometer wiper. This wiper is associated with a first conductor which is connected to another pair of oppositely poled diodes each of which is connected individually to one terminal of the energizing winding of one of the DC motors, while another terminal of each such winding is connected over a second conductor to the AC source. Thus, a single potentiometer is adjustable to vary the amount of resistance and current flow in each of the conductive paths provided through the diode array and motors on alternate half cycles of the supplied AC power.

Control circuitry of the immediately foregoing design is embodied in a structure for controlling DC motors which move and steer a wheeled vehicle over two track conductors in accordance with another aspect of my invention. Each of the motors actuates a gear mechanism associated with a wheel of the vehicle to control the speed of the wheel rotation. A potentiometer controls the operational speed of each motor and, in turn, the rotational speed of each associated wheel, whereby the vehicle is movable and steerable on the conductor tracks. In the case where both of the motors are operating at the same speed, the wheels are rotatable at the same speed. However, where one motor operates at a higher speed than the other, its associated wheel rotates faster and controls the steering and movement of the vehicle in the direction of the slower moving wheel. The motors and the pair of connected diodes advantageously are mounted on the vehicle and are connectable to the track conductors by brushes.

Another aspect of my invention is the provision of two sets of the control circuitry of the foregoing design which are utilized for controlling four DC motors over three conductors and with a common AC source. It is a feature of my invention that each such control circuitry set comprises a potentiometer for selectively controlling the operational speed of a pair of the motors and a rheostat serially connectable between the AC source and a pair of the oppositely poled diodes for simultaneously controlling the operational speeds of both motors.

Another feature, related to the immediately previous one, is the utilization of the two sets of control circuitry for controlling the movement and steering of two wheeled vehicles over a three-conductor track.

A salient feature of my invention is the provision of a two-conductor track adaptable for rectangular or square surface dimensions, for example, and for enabling a wheeled vehicle to be moved and steered on the entire surface area. The track advantageously is a random access track comprising an insulating material sandwiched between a conductive material having a plurality of insulated apertures and another conductive material having a plurality of conductive studs projecting through the insulated apertures whereby the wheels of the vehicle are movable and steerable on the studs. The control circuitry is connectable to the track by means of a pivoting contactor which is mounted within an insulator receptacle and contacts the apertured conductive material under spring action while sliding around the studs during the movement and steering of the vehicle. A disk contactor member slides over the studs to provide a return connection to the control circuitry.

It is another feature of my invention that a wheeled vehicle is movable and steerable on the entire surface area of a flat conductive plate of rectangular or square dimensions, for example, with a cooperating overhead coordinate screen array of conductive material. The flat plate and screen materials thus form a "track" each of which is connectable to the control circuitry for controlling a pair of motors. Individual brushes are connectable to the plate and screen materials to complete the control circuit of my invention during the driving of the vehicle.

Another feature of my invention is the provision of a structure for selectively controlling either one at a time or simultaneously the adjustments of a pair of adjustable resistances, such as the previously described potentiometer and rheostat. This structure comprises driving members which are individually associated with shafts coupled to a slide of one of the resistances and are selectively engageable with a control drive member to position the slides of the resistances either one at a time or simultaneously.

The foregoing objects, features and advantages of my invention may be more clearly understood by a reading of the following description with reference to the drawings in which.

Figure 2:
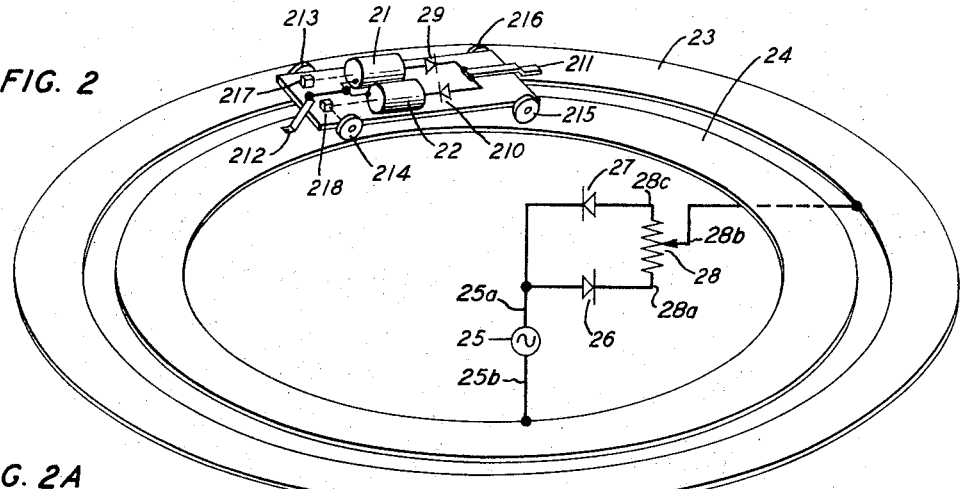
FIG. 2 depicts circuitry of FIG. 1 utilized for controlling the movement of a plural wheel mechanism on two-conductor tracks.
Figure 2A:
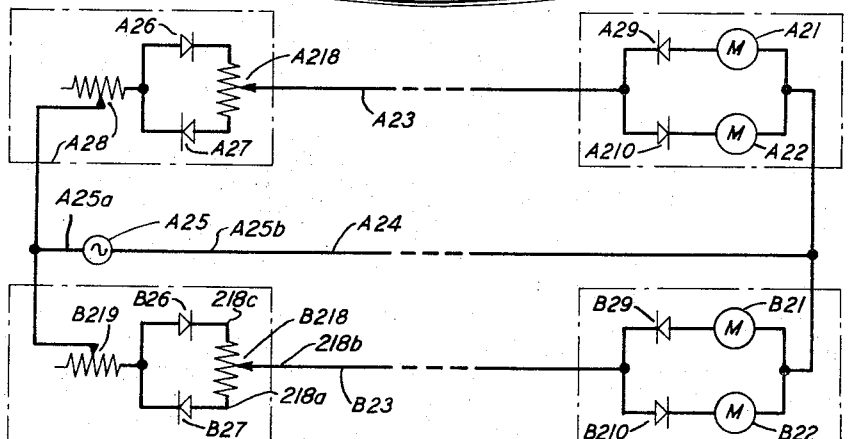
FIG. 2A shows circuitry for controlling the operation of four motors over three conductors.
Figure 2B:
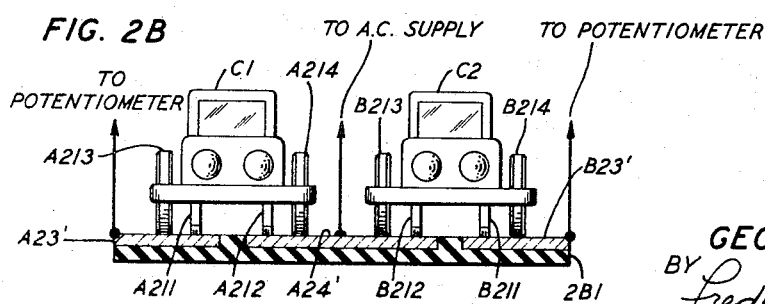
Figure 3:
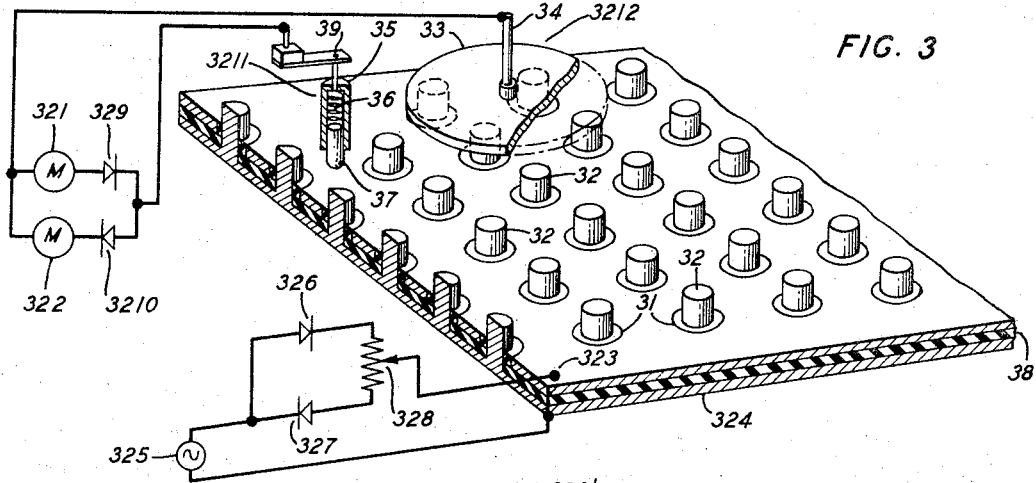
Figure 3A:
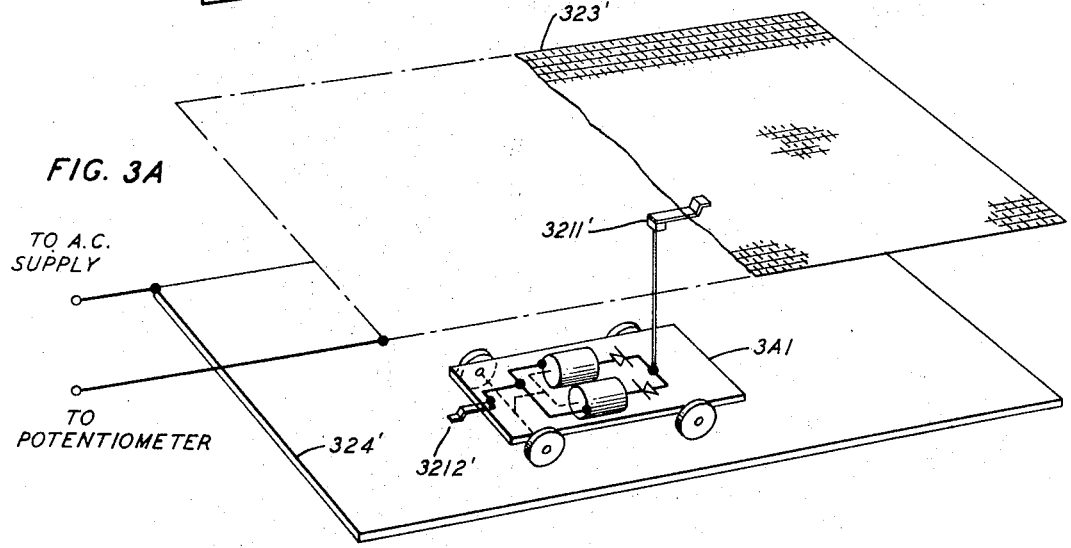
Figure 4:
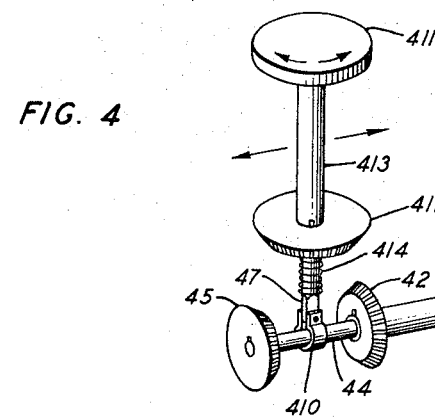

FIG. 2B utilizes circuitry of FIG. 2A for controlling the operation of two electrically-powered cars on three-conductor tracks;

FIG. 3 illustrates a two-conductor track and contactor mechanism in accordance with my invention;

FIG. 3A shows a pair of conductor plates, one of which is an overhead grid conductor plate, and contactors for controlling the operation of a plural wheel mechanism; and FIG. 4 is a mechanical arrangement for controlling the adjustment of two adjustable resistances.

Figure 1:
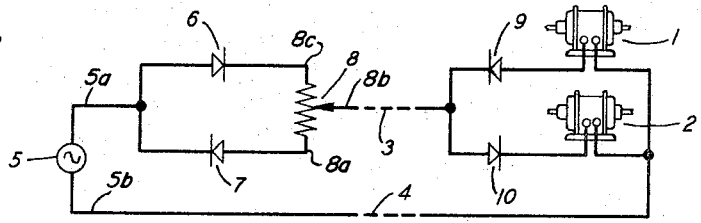
FIG. 1 is a schematic circuit drawing of a specific illustrative embodiment of the principles of my invention.

Referring to FIG. 1, a circuit is shown for controlling the operation of DC motors 1 and 2 over a pair of conductors 3 and 4. A source 5 is included in the circuit for supplying over two leads 5a and 5b an AC voltage which is separated into positive and negative half-cycles by the diodes 6 and 7, attenuated by the resistance of the potentiometer 8, and applied over conductors 3 and 4 to the diodes 9 and 10 for energizing the motors 1 and 2. On negative half-cycles of the AC voltage of source 5, a circuit is completed for energizing motor 1 over the path from source 5 over lead 5a through diode 7, second and first terminals 8a and 8b of potentiometer 8, conductor 3, diode 9 and motor 1 to conductor 4 and lead 5b. Similarly, on positive half-cycles of the AC voltage, a circuit is completed for energizing the motor 2 over the path from source 5 over lead 5a through diode 6, third and first terminals 8c and 8b of potentiometer 8, conductor 3, diode 10 and motor 2 to conductor 4 over lead 5b. The use of the potentiometer 8 in this circuit enables a single adjustment thereof concurrently to reduce the potentiometer resistance in the energizing path of one of the motors and to increase the potentiometer resistance in the energizing path of the other one of the motors. A resistance reduction in such a path increases the current flow through the energized motor and thereby may advantageously be used to increase the rotational speed of the shaft (not shown) of that motor. On the other hand, when the resistance is increased in such a path, the current flow through the energized motor is decreased and the rotational speed of that motor shaft (not shown) is decreased.

Turning now to FIG. 2, it may be seen that circuitry of FIG. 1 is included in a system for controlling the movement of a four-wheel mechanism on two electrically separate circular tracks of conductor material. Each of the elements of FIG. 2 which corresponds to an element of FIG. 1 is similarly numbered in FIG. 2 except that a prefix digit 2 is added. The four-wheel mechanism is initially placed so that conductor track 23 contacts wiper 211 and conductor track 24 contacts wiper 212. Such a placement enables the energizing circuits for motors 21 and 22 to be completed and the wheeled mechanism to be moved around the tracks 23 and 24.

Motor 21 is energized on negative half-cycles of the AC voltage supplied by source 25 over the path via lead 25a through diode 27, terminals 28c and 28b of potentiometer 28, track 23, wiper 211, diode 29, motor 21, wiper 212 and track 24 to lead 25b. On the positive half-cycles of the AC voltage of source 25, motor 22 is energized over the path via lead 25a through diode 26, terminals 28a and 28b of potentiometer 28, track 23, wiper 211, diode 210, motor 22, wiper 212 and track 24 to lead 25b.

In accordance with my invention, axle driving devices 217 and 218 are controlled by the motors 21 and 22, respectively, for individually rotating one of the wheels 213 or 214. The potentiometer 28 is used for adjusting the operational speed of each of the motors 21 and 22 by increasing and decreasing the resistance in the motor energizing circuit whereby the associated driving device 217 or 218, in turn, controls the speed of the associated one of the wheels 213 or 214 for steering the wheeled mechanism around the tracks 23 and 24.

The structure of FIG. 2A shows another aspect of my invention wherein the operational speeds of four DC motors are controllable over three conductors with two potentiometers and a single AC supply. FIG. 2A essentially comprises a combination of two sets of the apparatus configuration shown in FIG. 2 with each such set sharing a conductor A24. In FIG. 2A, the apparatus of each set corresponding to that of FIG. 2 is similarly designated in FIG. 2A except that a prefix digit A or B is added to distinguish each set. FIG. 2A also comprises the variable resistances A219 and B219 to control the magnitude of the current flow from supply A25 through the conductors A23 and B23, respectively, and, in turn, through each pair of the associated motors A21, A22 and B21, B22. Accordingly, the resistances A219 and B219 control the speed of the latter motors.

Each of the motors A21 and B21 is energizable on each positive half cycle of the AC voltage supplied on conductor A24. The energizing path for motor A21 thus is from the positive potential on conductor A24, motor A21, diode A29, conductor A23, potentiometer A28, diode A27, and resistance A219 to the negative potential of supply A25. Motor B21 is energized over the path from the positive potential of supply A25 over conductor A24, motor B21, diode B29, conductor B23, potentiometer B28, diode B27, and resistance B219 to the negative potential of supply A25.

The motors A22 and B22 are energizable on each negative half cycle of the AC voltage supplied on conductor A24. Motor A22 is energized over the path from the negative potential of supply A25 over conductor A24, motor A22, diode A210, conductor A23, potentiometer A28, diode A26, and resistance A219 to the positive potential of supply A25. The energizing path of motor B22 is from the negative potential of supply A25 over conductor A24, motor B22, diode B210, conductor B23, potentiometer B28, diode B26, and resistance B219 to the positive potential of supply A25.

FIG. 2B depicts a sectional view of an insulated platform material 2B1 supporting three electrically separated conductive tracks A23', A24' and B23' on which are placed the cars C1 and C2. In accordance with another aspect of my invention, the circuitry of FIG. 2A may be advantageously utilized for controlling the speed and steering of the cars C1 and C2 on the tracks A23', A24' and B23'. The latter tracks correspond respectively to the conductors A23, A24 and B23 of FIG. 2A. Such a utilization employs the structural arrangement of FIG. 2 for each of the cars; that is, a brush A211 or B211 in contact with the track A23' or B23' and a pair of oppositely-poled diodes each of which is individually connected to the energizing winding of one of a pair of motors, and which winding is connected to a brush A212 or B212 in contact with track A24'. Moreover, the motors of each car are coupled to axle driving means corresponding to that of means 217 and 218 in FIG. 2 for individually rotating the associated wheels A213 and A214 or B213 or B214. In the application of the circuitry of FIG. 2A to the structure of FIG. 2B each of the resistances A219 and B219 control the speed of both motors in an individual one of the cars C1 and C2, respectively, and accordingly the rotational speed of the associated wheels A213, A214 and B213, B214 of such cars on the associated tracks A23', A24' and B23'. Thus, the resistances A219 and B219 control the speed of car movement on the latter tracks. The potentiometer A28 and B28 in such an application also control the speed of the associated car motors for steering the car on the tracks. These potentiometers control the speed of the motors in a different way than the resistances A219 and B219. The latter resistance either increases or decreases the speed of both of the associated motors at the same time, while the potentiometers A28 and B28 are used for maintaining each such motor at the same speed or decreasing the speed of one such motor while at the same time increasing the speed of the other such motor or conversely for each pair of the motors.

In FIG. 3, a random-access, two-conductor, and two-dimensional track and contactor mechanism in accordance with another feature of my invention is shown incorporated with the circuitry of FIG. 2. The track comprises an insulating material 38 sandwiched between a conductive material 323 (corresponding to the track conductor 23 of FIG. 2) having a plurality of insulated apertures 31, and another conductive material 324 (corresponding to the track conductor 24 of FIG. 2) having a plurality of conductive studs 32 projecting through material 38 and the insulated apertures 31 to a prescribed elevation above the material 323. The material 324 is electrically connected to the AC source 325 which is, in turn, connected through a pair of diodes 326 and 327 and potentiometer 328 to the track material 323 for furnishing power to the elements 3211 and 3212 (corresponding to the brushes 211 and 212 of FIG. 2) of the contactor mechanism.

The element 3211 comprises an insulator receptacle 35 having a hollow internal section for a spring 36 and a conductive contactor 37. Receptacle 35 is suitable for pivotal mounting on a wheeled vehicle (not shown) by means of the pivot linkage 39 and in such a manner as to enable contactor 37 to contact the material 323 when the wheels (not shown) of the vehicle are placed upon the studs 32. Element 3211 is thus pivotally mounted so that it moves about the raised studs 32 during the movement and steering of such a vehicle on the studded track, as explained hereinafter. Spring 36 is used to maintain contact between contactor 37 and material 323 during the movement of the vehicle (not shown) on the track. Contactor 37 is electrically connected to the diodes 329 and 3210 each of which is individually connected to one of the motors 321 or 322 which, in turn, are connected to the contactor element 3212. The latter element comprises a conductive disk 33 which is operatively mounted on the vehicle (not shown) by the shaft 34 in such a manner as to contact the raised studs 32 when the vehicle wheels are placed thereon. Moreover, the disk 33 is electrically connected to the motors 321 and 322.

The structure of FIG. 3 may advantageously be utilized as, for example, a square or rectangular or circular track for an electrical wheel-driven vehicle, such as that of FIG. 2, whereby the vehicle is driven over the entire area of the track. To illustrate, assume that the track of FIG. 3 is four-by-four feet in width and length with the studs 32 extending upwardly through the insulated apertures 31 and uniformly spaced over the entire width and length of the track. In addition, assume that a wheeled vehicle, such as that of FIG. 2, is equipped with the pivotally mounted contactor elements 3211 and 3212, and that such a vehicle is placed with its wheels (not shown) upon the studs 32 whereby the contactor 37 and disk 33 are electrically in contact with the materials 323 and 324, respectively. Furthermore, assume that the wheels (not shown) of such vehicle are controlled by the motors 321 and 322 for moving and steering the vehicle in such a manner as described with respect to the structure of FIG. 2. Accordingly, a structure having the circuit and electrical operation of FIG. 2 is furnished and the vehicle advantageously is moved and steered on the studs 32 of the entire four-by-four track by controlling the potentiometer 328. As the vehicle is so moved and steered, the disk 33 is in contact with at least one of the studs 32 and the contactor 3211 pivots around the studs 32 with the receptacle 33 insulating the studs 32 from the contactor 37 which contacts the track material 323 under the tension of spring 36.

In accordance with another aspect of my invention, FIG. 3A sets forth an arrangement for controlling the movement of a wheel-driven vehicle 3A1 on the surface of a flat conductive material with a conductive screen material operably mounted above that vehicle. The electrical circuit for the structure of FIG. 3A advantageously corresponds to that of FIG. 2. Accordingly, only the structural features of the conductive flat and screen materials are now explained. The flat conductive material 324' (corresponding to element 24 of FIG. 2) connects AC power to the brush contactor 3212' (corresponding to element 212 of FIG. 2) and provides a flat surface upon which vehicle 3A1 is moved and steered. The overhead screen 323' (corresponding to conductive material 23 of FIG. 2) is a coordinate array of conductive material which connects a potentiometer (corresponding to potentiometer 28 of FIG. 2) to the brush contactor 3211' (corresponding to contactor 211 of FIG. 2). The material 324' and 323' similarly may, for example, comprise a four-by-four feet driving surface as in the electrical circuit of FIG. 3 whereby the wheeled vehicle can be driven and steered over the entire surface area of material 324' under control of a potentiometer (not shown). According to another aspect of my invention, the screen material 323' preferably is mounted at the underside of a rigid, transparent material, such as a plastic, for rigidity and for enabling an operator to view the movement and steering of the vehicle 3A1 on the surface of material 324'. In addition, it is within the scope of my invention that the surface of the material 324' may be made other than flat and, instead, in a fashion indicating a conventional highway and its associated terrain together with hills, obstructions, curves and straightaways.

FIG. 4 discloses a structural arrangement for selectively controlling either one-at-a-time or simultaneously the adjustments of a pair of adjustable resistances, such as the potentiometer A28 and rheostat A219 of FIG. 2A. The arrangement comprises an outer hollow shaft 41 of nonconductive material affixed to a drive member 42 and a conductive slide 43. It also comprises an inner shaft 44 of nonconductive material rotatably positioned within the hollowed section of shaft 41 and affixed to both a drive member 45 and a conductive slide 46. The slides 43 and 46 are slidably connectable to the resistance elements 49 and 48, respectively, for rheostat and potentiometer action as in the circuit of FIG. 2A. Elements 49 and 48 may advantageously be constructed of resistance wire.

A control shaft 47 is pivotally mounted to a collar member 410 which is secured about the shaft 44. A control element having a knob 411 and a drive member 412 affixed at opposite ends of a hollowed-sleeve shaft section 413 is rotatably positioned upon the shaft 47. The structure further includes a spring 414 which is mounted around the shaft 47 above the collar 410 and below the drive member 410 for returning the control element to the position shown in FIG. 4 after it has been momentarily depressed.

In accordance with the electrical circuit of FIG. 2A, the slide 43 is advantageously connectable to one terminal of an AC supply and the resistance 49 is connectable to each of the oppositely-poled diodes, such as diodes A26 and A27 of FIG. 2A. Similarly, the slide 46 is connectable to a control conductor, such as conductor A23 of FIG. 2A, and each terminus of the resistance 48 is individually connectable to one of the diodes, such as diode A26 or A27 of FIG. 2A.

The positioning of the slides 43 and 46 on the resistances 49 and 48, respectively, is controllable with the knob 411. When only the slide 43 is to be moved, the knob 411 is moved forward toward the resistances 49 and 48 and the shaft 47 is pivoted on collar 410. Next, the knob 411 is pressed downward against the spring 414 to engage the drive members 42 and 412. Knob 411 is then rotatable whereby with friction action the drive members 42 and 412, in turn, rotate to adjust the position of the wiper 43 on resistance 49 thus to adjust the resistance between the AC supply and the associated diodes.

To move the slide 46 without adjusting slide 43, knob 411 is moved rearwardly away from the resistances 49 and 48 and shaft 47 is pivoted on collar 410 toward drive member 45. Knob 411 is then pressed down against the spring 414 to engage the drive members 45 and 412. The rotation of knob 411 then, by friction action, rotates the members 45 and 412 to adjust the position of wiper 46 on resistances 48 thus to adjust the resistances between the control conductor and the associated diodes.

Both slides 43 and 46 are simultaneously positionable on the resistances 49 and 48, respectively, by moving knob 411 to the midposition as shown in FIG. 4 and then depressing the knob thereby to engage drive member 412 with each of the members 42 and 45. The rotation of knob 411 thereafter moves the members 42 and 45 whereby the positions of slides 43 and 46 are adjusted on the resistances 49 and 48.

For structural rigidity and positioning control of the slides 43 and 46 as already described, it is within the contemplation of my invention that a pair of collar mounting members (not shown) may be operably associated near each end of each of the shafts 41 and 44. These mounting members may also be affixed to a chassis (not shown) to insure that shafts 41 and 44 are mechanically movable without friction interference.

It is to be understood that the hereinbefore described arrangements are illustrative of the application of the principles of my invention. Numerous other arrangements may be devised by those skilled in the art without departing from the spirit and scope of the invention.

What is claimed is:

1. An electrical circuit comprising means for supplying a bidirectional current to two leads; a unidirectional current apparatus; a pair of control conductors, a first one of said conductors being connectable to a first one of said leads; potentiometer means for controlling the current magnitude of each directional segment of said bidirectional current over said conductors and having a first terminal connectable to a second one of said pair of conductors, a second terminal serially connected through said apparatus to the other one of said leads, and a third terminal serially connectable with said other one of said leads; a pair of electroresponsive devices selectively operable under control of the currents supplied over said conductors; and a pair of unidirectional current elements each connected oppositely-poled in circuit with an individual one of said electroresponsive devices between said pair of conductors, a second unidirectional current apparatus serially connectable between said third potentiometer terminal and said other one of said leads and being oppositely-poled to said unidirectional current apparatus connected to said second potentiometer terminal, and said potentiometer means being actuatable for selectively increasing and decreasing the magnitude of the operating current on said conductors for one of said pair of devices and in the opposite sense concurrently decreasing and increasing the operating current on said conductors for the other one of said pair of devices.

2. An electrical circuit in accordance with claim 1 further comprising a pair of unidirectional current devices connectable oppositely-poled to said second one of said pair of leads; a third conductor; another potentiometer means for adjusting the magnitude of each directional segment of said bidirectional current over said first and third conductors and having a first terminal connected to said third conductor, a second and a third terminal each being serially connected through an individual one of said pair of unidirectional current devices to said second one of said leads; another pair of electroresponsive devices; and another pair of unidirectional current elements connected oppositely-poled to said third conductor and each of said last-mentioned elements being individually connectable in series with one of said other pair of electroresponsive devices and said first one of said pair of conductors.

3. An electrical circuit in accordance with claim 1 further comprising means for adjusting the magnitude of the bidirectional current supplied to said two leads, and wherein each of said electroresponsive devices comprises a direct current motor, each of said unidirectional current apparatus and elements comprises a semiconductor diode, said element diodes being connected oppositely-poled to said second one of said pair of conductors and each of said element diodes being individually connectable in series with one of said motors and said first one of said pair of conductors.

4. An electrical circuit in accordance with claim 3 wherein said potentiometer means comprises a resistance potentiometer having first and second ends of the resistance individually connected to one of said apparatus diodes and a wiper member for wiping upon said resistance and being connectable to said second one of said pair of conductors, and said magnitude adjusting means comprises an adjustable resistance having a resistance terminal and a wiper means for wiping upon said last-mentioned resistance and said resistance terminal and wiper means being serially connectable in circuit with said apparatus diodes; and further comprising means for individually and concurrently adjusting said potentiometer wiper member and said adjustable resistance wiper means having a first hollowed shaft having a first terminus affixed to said wiper means and a second terminus connected to a first drive member; a second shaft member having a segment of said shaft extending through said hollowed section of said first shaft member, a first terminus affixed to said wiper member and a second terminus connected to a second drive member; a collar means positioned about said second terminus of said second shaft member; a third shaft pivotally attached to said collar means; a control member having a hollowed section rotatably positioned about said third shaft means, a control drive member and a control knob; and spring means positioned around said third shaft between said collar and said control drive means; said control member being responsive to prescribed pressures on said knob against said spring means for selectively engaging said control drive member with any one of said first and second drive members individually and jointly; said control member being further responsive to the rotation of said knob while retaining said pressures thereon for causing said control drive member to rotate said first and second drive members individually and jointly.

5. In combination, means for supplying a bidirectional current to two leads; a pair of unidirectional current devices connected oppositely-poled to a first one of said two leads; a pair of electrically conductive tracks, one of said tracks being connected to a second one of said leads; potentiometer means for adjusting the magnitude of each directional segment of said bidirectional current over said tracks and having a first terminal connected to a second one of said tracks, a second and a third terminal each being connected individually to one of said devices in series with said first one of said leads; a vehicle having a plurality of wheels movable on said tracks, means including a pair of brushes each of which is slidably connectable to an individual one of said conductive tracks, a pair of unidirectional current elements connected oppoistely-poled to a first one of said brushes, and a pair of motor mechanisms each being operably connected to the second one of said brushes and to an individual one of said elements in series with said first one of said brushes, and each of said mechanisms being individually associated with one of said wheels and being responsive to the current magnitude of one directional segment of said bidirectional current received via the associated element, brushes, tracks and device for controlling the rotational speed of said one wheel on one of said tracks, and said potentiometer means including a single potentiometer actuatable for selectively increasing and decreasing the magnitude of the operating current on said conductors for one of said pair of motor mechanisms and in an opposite sense concurrently decreasing and increasing the operating current on said conductors for the other one of said pair of motor mechanisms.

6. The combination set forth in claim 5 further comprising another pair of unidirectional current devices connected oppositely-poled to said first one of said two leads; another electrically conductive track; another potentiometer means for adjusting the magnitude of each directional segment of said bidirectional current over said other conductive track and having a first terminal connected to said other conductive track, a second and a third terminal each being individually connected to one of said other pair of devices in series with said first one of said two leads; another vehicle having a plurality of wheels movable on said other track and a plurality of wheels movable on said one of said pair of tracks connected to said second one of said two leads, means including another pair of brushes, a first one of said brushes being slidably connectable to said other track and the other one being connectable to said one of said pair of tracks connected to said second one of said two leads, another pair of unidirectional current elements connected oppositely-poled to said first one of said other pair of brushes, and another pair of motor mechanisms each being connected to said other one of said other pair of brushes and to an individual one of said other pair of elements in series with said first one of said other pair of brushes, and each of said other pair of mechanisms being individually associated with one of said pluralities of wheels and being responsive to the current magnitude of one directional segment of said bidirectional current received via the associated element, brushes, tracks, and device for controlling the rotational speed of said one wheel on the associated track.

7. The combination set forth in claim 6 further comprising a pair of current adjusting devices, each of which is individually connectable in series with said second one of said two leads and one of said pairs of unidirectional current devices for controlling the magnitudes of current flow through said one of said pairs of devices.

8. Electrical apparatus for controlling the movement of a vehicle comprising means for supplying a bidirectional current to two leads; a pair of unidirectional current devices connected oppositely-poled to a first one of said leads; structural means for the movement of the vehicle including a conductive material having a plurality of apertures, a conductive element being connectable to a second one of said leads and having a plurality of conductive studs defining a surface upon which the wheels of the vehicle are movable, each of said studs projecting through one of said apertures in said material, and an insulating member sandwiched between said material and said element; potentiometer means having a first terminal connectable to said apertured material, a second and a third terminal each being connected individually to one of said devices in series with said first one of said leads; the vehicle having a plurality of wheels movable on said studs, a first contactor means including an insulated receptacle, and a conductive means for contacting said conductive material when the wheels of said vehicle are placed upon said studs, said contactor means being pivotally mounted to said vehicle for pivoting about said studs, a second contactor means for contacting a plurality of said studs when said first contactor means contacts said material, a pair of motor mechanisms, a pair of unidirectional current elements connected oppositely-poled in circuit with said mechanism between said contacting means and said second contactor means, and each of said mechanisms being individually associated with one of the wheels of said vehicle and being responsive to one directional segment of said bidirectional current received under control of said potentiometer for controlling the rotation of said one wheel on said studs.

9. Electrical apparatus in accordance with claim 8 wherein said first contactor means further includes a spring member and wherein said receptacle has a hollowed section for housing said spring and said conductive contacting means.

10. Electrical apparatus for controlling the movement of a vehicle comprising means for supplying a bidirectional current to two leads; a pair of unidirectional current devices connected oppositely-poled to a first one of said leads; structural means for the movement of the vehicle including a conductive surface upon which the wheels of the vehicle are movable and being connectable to a second one of said leads, and an array of conductive screening mounted above said conductive surface; potentiometer means having a first terminal connected to said conductive screening, a second and a third terminal each being connected individually to one of said devices in series with said first one of said leads; a vehicle having a plurality of wheels movable on said surface, a first brush means slidably connectable to said surface, a second brush means slidably connectable to said conductive screening, a pair of unidirectional current elements connected oppositely-poled to said second brush means, and a pair of motor mechanisms each being operably connected to said first brush means and to an individual one of said elements in series with said second brush means, and each of said mechanisms being individually associated with one of said wheels and being responsive to one directional segment of said bidirectional current received under control of said potentiometer for controlling the rotational speed of said one wheel on said surface, and said potentiometer means including a single potentiometer actuatable for selectively increasing and decreasing the magnitude of the operating current on said conductors for one of said pair of motor mechanisms and in the opposite sense concurrently decreasing and increasing the operating current on said conductors for the other one of said pair of motor mechanisms.

References Cited

UNITED STATES PATENTS

| | | | |
|---|---|---|---|
| 1,982,391 | 11/1934 | Markey | 180—2 |
| 2,754,432 | 7/1956 | Mostek. | |
| 2,768,697 | 10/1956 | Shotwell | 180—2 |
| 3,205,618 | 9/1965 | Heytow | 180—82.1 |
| 3,239,963 | 3/1966 | Smith et al. | 180—79.1 |
| 3,288,232 | 11/1966 | Sheppard | 180—1 |

KENNETH H. BETTS, *Primary Examiner.*